US006240643B1

(12) United States Patent
Civalleri

(10) Patent No.: US 6,240,643 B1
(45) Date of Patent: Jun. 5, 2001

(54) CUTTING HEAD FOR A WIRE CUTTING MACHINE, IN PARTICULAR A STRIMMER

(76) Inventor: Davide Civalleri, 12011 Borgo San Dalmazzo, Via Garibaldi, 4 (IT)

( * ) Notice: Subject to any disclaimer, the term of this patent is extended or adjusted under 35 U.S.C. 154(b) by 0 days.

(21) Appl. No.: 09/214,063

(22) PCT Filed: Jun. 27, 1997

(86) PCT No.: PCT/IT97/00154

§ 371 Date: Apr. 28, 1999

§ 102(e) Date: Apr. 28, 1999

(87) PCT Pub. No.: WO98/00004

PCT Pub. Date: Jan. 8, 1998

(30) Foreign Application Priority Data

Jun. 28, 1996 (IT) ............................................... TO96A0559

(51) Int. Cl.[7] .................................................... A01D 34/73

(52) U.S. Cl. .............................................. 30/276; 56/12.7

(58) Field of Search .................................. 30/276, 277.4, 30/347; 56/12.7

(56) References Cited

U.S. PATENT DOCUMENTS

| 2,663,137 | * | 12/1953 | Asbury . |
| 4,043,037 | * | 8/1977 | Okamoto et al. . |
| 4,062,115 | * | 12/1977 | Lee . |
| 4,190,954 | * | 3/1980 | Walto . |
| 4,685,279 | * | 8/1987 | Gullet . |
| 4,726,176 | * | 2/1988 | McGrew . |
| 4,756,146 | * | 7/1988 | Rouse . |
| 5,048,278 | * | 9/1991 | Jones et al. . |
| 5,768,867 | * | 6/1998 | Carlsen . |
| 5,836,227 | * | 11/1998 | Dees, Jr. et al. . |
| 5,852,876 | * | 12/1998 | Wang . |
| 6,052,907 | * | 4/2000 | Wang . |

* cited by examiner

Primary Examiner—Kenneth E. Peterson
(74) Attorney, Agent, or Firm—Ladas & Parry

(57) ABSTRACT

A cutting head for a cutting machine, in particular a strimmer, having a hub (4) connected to a drive member (9) of the cutting machine, and a number of filiform elements (7) connected to and extending substantially radially from the hub (4); each pair of filiform elements (7) being defined by respective end portions (7a, 7b) of a single wire having a C-shaped intermediate portion (7c) housed firmly inside the hub.

10 Claims, 2 Drawing Sheets

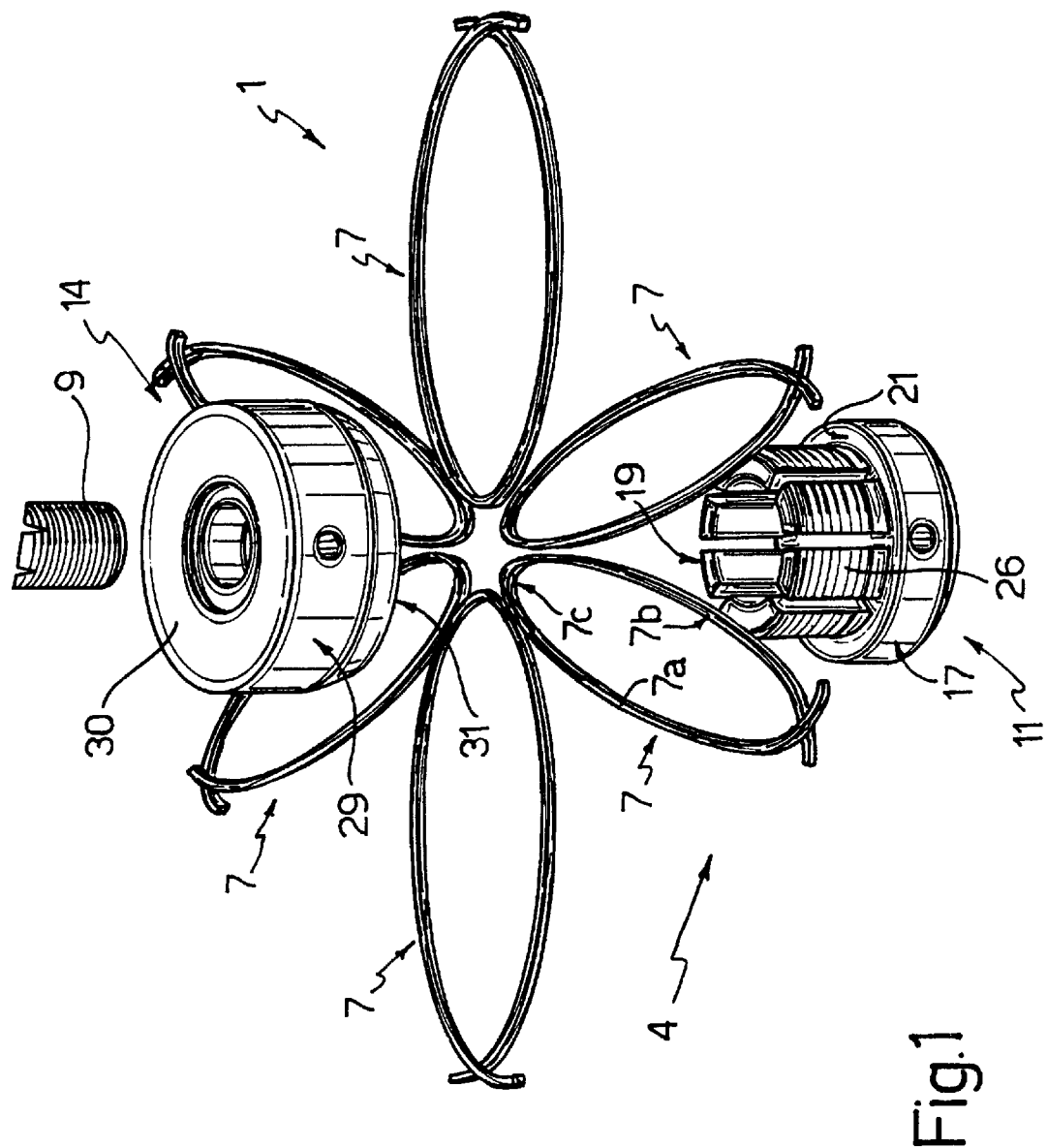

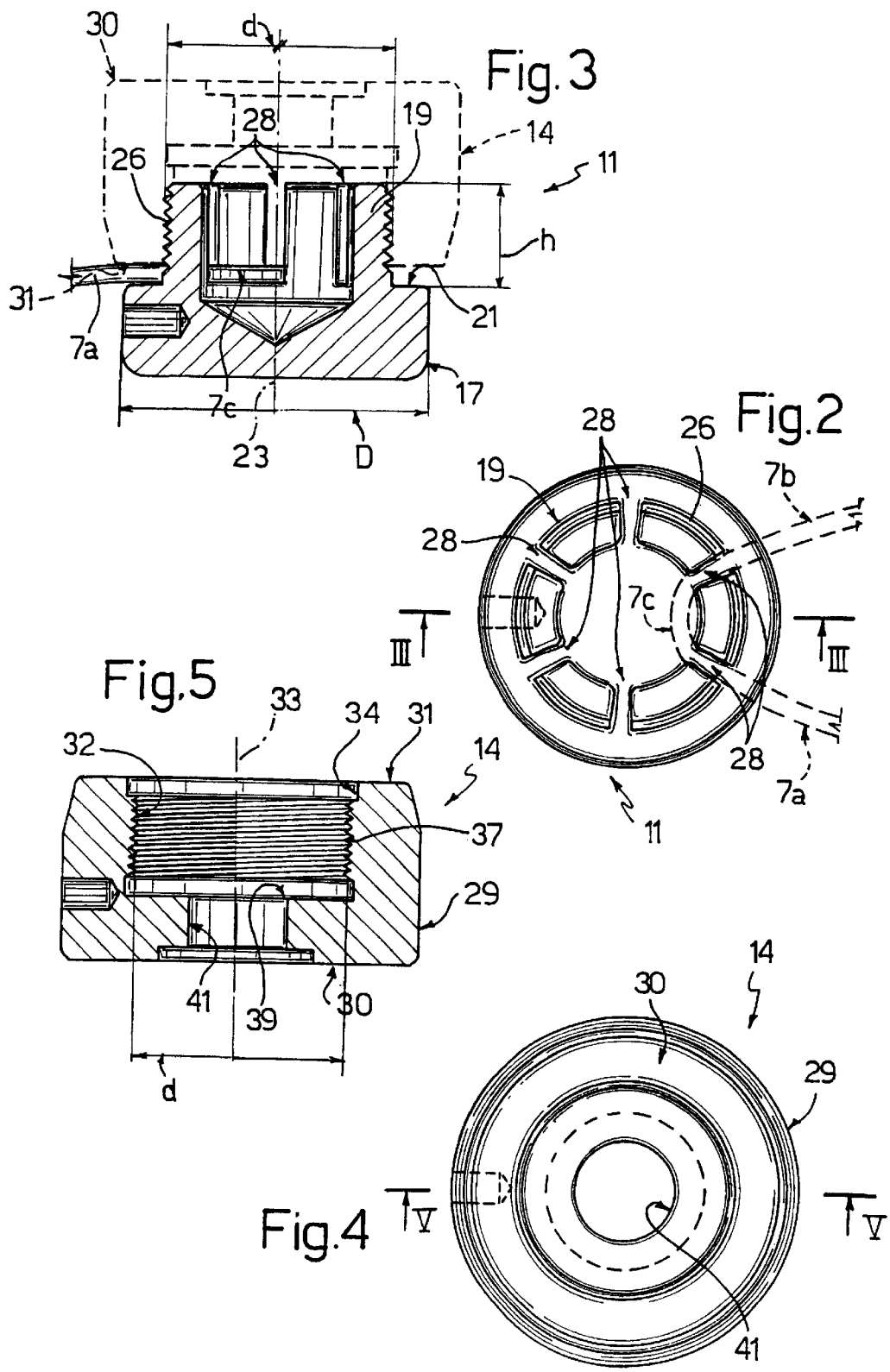

CUTTING HEAD FOR A WIRE CUTTING MACHINE, IN PARTICULAR A STRIMMER

TECHNICAL FIELD

The present invention relates to a cutting head for a wire cutting machine, in particular a string trimmer.

BACKGROUND ART

Wire cutting machines are known, which comprise a substantially cylindrical hub, and a number of filiform elements, each comprising an end portion connected to the hub, and each extending from the hub substantially radially; and the hub is connected to an output shaft rotated by an electric motor or combustion engine of the machine to rotate the filiform elements at high speed and so perform the desired cutting action.

On known cutting machines, the spin imparted to the filiform elements by the high rotation speed of the hub may be such as to detach the elements from the hub, thus resulting in injury to the user.

DISCLOSURE OF THE INVENTION

It is an object of the present invention to documents U.S. Pat. No. 2,663,137 and U.S. Pat. No. 4,062,115 describe cutting heads as defined in the preamble of claim 1 provide a cutting head for a wire cutting machine, designed to prevent detachment of the filiform elements.

According to the present invention, there is provided a cutting head for a wire cutting machine, in particular a string trimmer as claimed in claim 1.

BRIEF DESCRIPTION OF DRAWINGS

A preferred, non-limiting embodiment of the present invention will be described by way of example with reference to the accompanying drawings, in which:

FIG. 1 shows an exploded view in perspective of a cutting head for a cutting machine, in particular a string trimmer, in accordance with the teachings of the present invention;

FIG. 2 shows a top plan view of a first element of the FIG. 1 cutting head;

FIG. 3 shows a section of the first element along line III—III in FIG. 2;

FIG. 4 shows a top plan view of a second element of the FIG. 1 cutting head;

FIG. 5 shows a section of the second element along line V—V in FIG. 4.

BEST MODE FOR CARRYING OUT THE INVENTION

Number 1 in FIG. 1 indicates a cutting head for a wire cutting machine, in particular a string trimmer. Head 1 comprises a hub 4, and a number of filiform elements 7 fitted to and extending radially from hub 4; and hub 4 is connected to an output shaft 9 rotated by a motor—e.g. an electric motor or combustion engine (not shown)— of the machine to rotate filiform elements 7 at high speed.

More specifically, hub 4 comprises an axially symmetrical first body 11 having seating means for housing filiform elements 7; and an axially symmetrical second body 14 connectable to first body 11 to firmly clamp filiform elements 7 inside the seating means.

With reference to FIGS. 2 and 3, first body 11 comprises a substantially disk-shaped base portion 17; and a cylindrical tubular wall 19 extending integrally from a flat face 21 of base portion 17 and coaxially with an axis 23 perpendicular to face 21. Wall 19 has an outside diameter d smaller than the diameter D of base portion 17, is defined externally by a cylindrical surface on which is formed a thread 26, and comprises a number of radial slots (six in the example shown) 28 equally spaced angularly about wall 19 (FIG. 2) and extending the full height h of wall 19 (FIG. 3). Each slot is defined laterally by two facing surfaces of wall 19, and at the bottom by a portion of face 21; and first body 11 is conveniently molded from plastic material, e.g. nylon.

With reference to FIGS. 4 and 5, second body 14 is substantially cylindrical, is defined by a cylindrical lateral wall 29 and by two opposite end walls 30, 31, and defines an inner cylindrical cavity 32 coaxial with axis 33 and communicating externally of body 14 through a circular opening 34 in wall 31. Cylindrical cavity 32 has a diameter substantially equal to diameter d, and is defined laterally by a cylindrical lateral wall having a thread 37, and by a flat bottom wall 39 perpendicular to axis 33; and a cylindrical opening 41 extends coaxially with axis 33 from bottom wall 39, communicates externally of body 14 on the opposite side to opening 34, and provides for housing output shaft 9 in angularly fixed manner.

Each pair of filiform elements 7 is defined by respective end portions 7a, 7b of a single wire comprising a C-shaped intermediate portion 7c fitted firmly to hub 4. More specifically, intermediate portion 7c is fitted inside wall 19, and engages two adjacent radial slots 28 (FIG. 2) from which the wire comes out with end portions 7a, 7b outside wall 19; the sector of wall 19 between the two adjacent slots 28 acts as a radial stop for intermediate portion 7c; and second body 14 is connected to first body 11 by screwing wall 19 inside cylindrical cavity 32 to grip intermediate portion 7c of the wire between face 21 and wall 31. In which position, intermediate portion 7c of the wire is connected firmly to hub 4 by the pressure exerted on the wire by bodies 11 and 14, and, even when hub 4 is rotated at high speed, detachment of the filiform elements is prevented by intermediate portion 7c being firmly housed inside wall 19 by the connection of bodies 11 and 14, and being prevented from moving radially by the constraint defined by the sector of wall 19 between the two adjacent slots 28.

Clearly, changes may be made to the cutting head as described and illustrated herein without, however, departing from the scope of the present invention.

What is claimed is:

1. A cutting head hub for connecting to a drive member and receiving a number of filiform elements of a string trimmer, the filiform elements each having an intermediate portion with opposite end portions extending substantially radially from said cutting head hub, said cutting head hub comprising:

an axially symmetrical first body; and an axially symmetrical second body for seating with said first body and clamping said filiform elements, wherein said axially symmetrical first body comprises at least a tubular wall having a number of angularly spaced radial slots for receiving said intermediate portion of each of said filiform elements at least partly inside said tubular wall and engaging two of said radial slots from which said end portions substantially radially extend;

wherein said axially symmetrical second body comprises at least a cavity for housing at least partially said tubular wall and an end portion for clamping said filiform elements; and wherein said tubular wall is defined externally by a cylindrical surface with a thread for said clamping of said filiform elements.

2. The cutting head hub as claimed in claim 1, characterized in that said first body comprises a substantially disk-shaped base portion and said tubular wall is cylindrical and extends in one piece from said base portion and coaxially with an axis transverse to said base portion.

3. The cutting head hub as claimed in claim 2, characterized in that said tubular wall has an outside diameter smaller than a diameter of said base portion.

4. The cutting head as defined in claim 3, characterized in that said radial slots extend the full height of said tubular wall.

5. The cutting head as defined in claim 2, characterized in that said radial slots extend the full height of said tubular wall.

6. The cutting head as defined in claim 1, characterized in that said radial slots extend the full height of said tubular wall.

7. A cutting head for a string trimmer, comprising a hub for connecting to a drive member of said string trimmer; and a number of the filiform elements fitted to and extending substantially radially from said hub; each pair of said filiform elements being defined by respective and portions of a single filiform element of said number of filiform elements; said hub comprising an axially symmetrical first body, and an axially symmetrical second body connected to said first body, characterized in that said axially symmetrical first body comprises at least a tubular wall in turn comprising a number of angularly spaced radial slots; an intermediate portion of each of the said filiform elements being housed at least partly inside said tubular wall, and being positioned with each of the said filiform elements engaging two said radial slots and with said end portions outside said hub, said first body having a disk-shaped base portion, said tubular wall being cylindrical and having an outside diameter smaller than the diameter of said base portion thus forming a lip on said base portion, said to tubular wall having an exterior threaded surface for screwing into a cavity on said second body, an end portion of said second body cooperating with said lip to clamp said filiform elements.

8. The cutting head hub as defined in claim 6, wherein said angularly spaced radial slots extend a full height of said tubular wall.

9. A cutting head hub for connecting to a drive member and receiving a number of filiform elements of a string trimmer, the filiform elements each having an intermediate portion with opposite end portions extending substantially radially from said cutting head hub, said cutting head hub comprising:

an axially symmetrical first body; and an axially symmetrical second body for housing at least part of said first body and clamping said filiform elements, wherein said axially symmetrical first body comprises at least a substantially cylindrical coaxial tubular wall having a number of angularly spaced radial slots for receiving said intermediate portion of each of said filiform elements at least partly inside said tubular wall and engaging two of said radial slots with said end portions substantially radially extending;

wherein said axially symmetrical second body comprises at least a cavity for said housing of at least part of said tubular wall and an end portion for said clamping said filiform elements, at least one of said cavity and said part of said tubular wall having a screw thread cooperative with the other of said cavity and said part of said tubular wall for said clamping; and wherein said axially symmetrical first body has a disk-shaped base portion, said tubular wall projecting coaxially from said disk-shaped base portion and having an outside diameter smaller than a diameter of said disk-shaped base portion for forming a lip for said clamping.

10. The cutting head hub as defined in claim 9, wherein said angularly spaced radial slots extend a full height of said tubular wall.

* * * * *